United States Patent [19]

Fukushima et al.

[11] 4,351,188
[45] Sep. 28, 1982

[54] METHOD AND APPARATUS FOR REMOTE MEASUREMENT OF WIND DIRECTION AND SPEED IN THE ATMOSPHERE

[75] Inventors: Madoka Fukushima, Tokyo; Kin-ichiro Akita, Sayama; Yoshihisa Masuda, Musashino, all of Japan

[73] Assignee: Radio Research Laboratories, Ministry of Posts and Telecommunications, Koganei, Japan

[21] Appl. No.: 268,107

[22] Filed: May 28, 1981

[30] Foreign Application Priority Data

May 30, 1980 [JP] Japan .................................. 55/71448

[51] Int. Cl.$^3$ ........................ G01W 1/02; G01W 1/00; G01S 13/00
[52] U.S. Cl. ........................................ 73/189; 73/188; 343/5 W; 343/6 R
[58] Field of Search ................ 343/5 W, 6 R; 73/189, 73/188, 170 R

[56] References Cited

U.S. PATENT DOCUMENTS

| | | |
|---|---|---|
| 2,928,277 | 3/1960 | Cavanagh et al. .................. 73/189 |
| 3,379,060 | 4/1968 | Pear, Jr. ............................. 73/189 |
| 3,448,613 | 6/1969 | Kastner et al. ................. 343/5 W |
| 3,548,653 | 12/1970 | Corey ................................. 73/189 |
| 3,624,653 | 11/1971 | Kelly et al. .................... 343/5 W |
| 3,646,555 | 2/1972 | Atlas ............................. 343/5 W |
| 3,675,191 | 7/1972 | McAllister ..................... 73/170 R |
| 3,693,433 | 9/1972 | Kobori et al. ................... 73/189 |
| 3,725,914 | 4/1973 | Davidson et al. .............. 343/5 W |
| 3,735,333 | 5/1973 | Bulser et al. ................. 343/5 W |
| 3,889,533 | 6/1975 | Balser ............................. 73/189 |
| 4,114,135 | 9/1978 | Funk ............................. 343/6 R |
| 4,179,630 | 11/1979 | Nicoli ............................. 73/189 |
| 4,206,639 | 6/1980 | Balser ............................. 73/189 |
| 4,219,887 | 8/1980 | MacCready, Jr. ................ 73/189 |
| 4,222,265 | 9/1980 | Ravussin ....................... 343/5 W |
| 4,223,309 | 9/1980 | Payne ............................ 343/5 W |
| 4,286,462 | 9/1981 | Bourne ............................ 73/189 |

FOREIGN PATENT DOCUMENTS 2150447 6/1972 Fed. Rep. of Germany .... 73/170 R 55-140181 11/1980 Japan .................................. 343/5 W
656004 4/1979 U.S.S.R. .......................... 343/5 W

OTHER PUBLICATIONS

Acoustic Radar Reads Wind Speed Remotely, Dec. 22, 1961 in "Electronics . . . ".
An Inexpensive Sonic Anemo. for Eddy Correlation, in Journal of Applied Meteorology, vol. 18, No. 8, Aug. 1979, by Campbell et al.
A Sonic Velometer, in IEEE Trans. on Instrumentation and Measurement, vol. IM-23, No. 3, pp. 203-210, Sep. 1974 by Stichman.
The Design and Operator of Acoustic Radar, in IEEE Trans. on Geoscience Electronics, vol. GE10, No. 1, Jan. 1972 by Parry et al.
The Xondar by R. L. Peace, Jr., "The Boulder Low--Level Intercomparison Experiment", pp. 87-97, Jun. 1980.

Primary Examiner—Anthony V. Ciarlante
Assistant Examiner—David V. Carlson
Attorney, Agent, or Firm—Oblon, Fisher, Spivak, McClelland & Maier

[57] ABSTRACT

An acoustic wave source and a radio wave source are installed close to each other on the ground. When an acoustic wave pulse is transmitted vertically into the atmosphere by the acoustic wave source, spherical wavefronts formed in the atmosphere by the acoustic wave are propagated upwardly at the velocity of sound. When a continuous radio wave is transmitted from the radio wave source toward the spherical wavefronts, it is reflected by the wavefronts and the reflected radio waves are converged to form a focusing spot on the ground. The position where the spot due to the convergence of the reflected radio waves is formed with the maximum intensity is detected by means of an antenna network formed of a multiplicity of receiving antennas laid out in the pattern of a lattice. The time-course change of such positions of the spots is traced to realize remote measurement of the height distribution of wind direction and speed in the atmosphere under surveillance.

11 Claims, 6 Drawing Figures

METHOD AND APPARATUS FOR REMOTE MEASUREMENT OF WIND DIRECTION AND SPEED IN THE ATMOSPHERE

BACKGROUND OF THE INVENTION

1. Field of Invention

This invention relates to a method and apparatus for the remote measurement of the height distribution of wind direction and speed in the atmosphere by hybrid use of radio and acoustic waves.

2. Description of Prior Art

As method for the remote measurement of wind profiles up to the height of some hundred meters, say 200 m or so above the ground, a combined system of bistatic Doppler acoustic radars and a combined system of three radio acoustic sounding systems have been known in the art.

The former system, based on the principle that the atmospheric turbulent regions play a role as scatterers for incident acoustic waves, and that a Doppler acoustic radar has the capability of detecting the radial component of wind velocity as a function of distance from its receiver, accomplishes the measurement of wind profiles up to the height of several hundred meters. (Robert L. Peace, Jr. "The XONDAR", The Boulder Inter-Comparison Experiment, pages 87–97, June 1980). This system, however, requires a considerably large place, at least an area enclosed by an equilateral triangle with sides 200 m long, for the installation of the whole system on the ground. Moreover, ground clutter due to side lobes of the acoustic antenna causes interference for the operation of this system.

The latter system proposed by the present inventors consists of three radio acoustic sounding systems (RASSs "A", "B", and "C"); one of them (e.g. RASS "B") is directed for the vertical and the other two (RASSs "A" and "C") for high elevation angles of two orthogonal directions. In this arrangement, RASS "B" measures the Doppler shift frequencies corresponding to the height distribution of the atmospheric temperature and RASSs "A" and "C" measure the Doppler shift frequencies corresponding to that of the atmospheric temperature and each radial component of the wind velocity. Such a set of measurements of Doppler shift frequencies by RASSs "A", "B" and "C" provides the height distribution of wind direction and speed, and that of atmospheric temperature. (Japanese Patent Application Disclosure No. 140181/1980). This system, however, suffers from the limitation of the range of measurable wind speed and inevitably necessitates use of special devices for the detection of Doppler shift frequencies.

SUMMARY OF THE INVENTION

An object of this invention is to provide a method for easy and accurate remote measurement of the height distribution of wind direction and speed in the atmosphere and an apparatus used for the measurement.

According to this invention, the measurement is effected by making use of the phenomena in which reflection and focusing of radio waves by the spherical wavefronts of sound produce a relatively small spot on the ground, and the horizontal and vertical shift of this spherical wavefront is determined by the wind profile and the travel time of the acoustic pulse. The height distribution of wind direction and speed in the atmosphere is derived from the time-course change of the position of this spot on the ground produced by the reflected radio waves by the spherical wavefront of sound transmitted as pulses. These radio waves and pulses of sound are transmitted vertically upwards from a radio wave transmitter and a pulse acoustic wave source installed closely side by side on the ground.

The other objects and characteristic features of the present invention will become apparent from the further disclosure of the invention to be made hereinbelow with reference to the accompanying drawing.

BRIEF DESCRIPTION OF THE DRAWINGS

FIG. 1 is an explanatory diagram illustrating the principle of the remote measurement of the wind direction and speed at altitudes in the atmosphere according to the present invention;

DESCRIPTION OF PREFERRED EMBODIMENT

The principle of the present invention will be described with reference to FIG. 1. A radio wave source 1 and an acoustic wave source 2 are installed close to each other on the ground.

From the acoustic wave source 2, one pulse of acoustic wave with sharp directivity is transmitted vertically into the atmosphere. The pulse acoustic wave, while propagating upwardly at the speed of sound, forms a plurality of spherical wavefronts of alternating condensation and rarefraction of air density separated by intervals equal to the wavelength of the sound wave. The degree of condensation and rarefaction of the spherical wavefronts propagated through the atmosphere is lowered in inverse proportion to the square of the distance from the acoustic wave source, and the expansion of the wavefronts is in proportion to the square of the distance. The component layers forming the spherical wavefronts severally function as the surfaces of reflection for the incident radio waves.

When no wind is blowing in the atmospheric region under surveillance, the pulse of acoustic wave transmitted from the acoustic wave source 2 propagates itself at the speed of sound through the mass of still air while forming spherical wavefronts in the vertical direction into the atmosphere. When a horizontal wind blows in the atmospheric region, the spherical wavefronts move in the air at the vector sum of the speed of sound in the still air and the wind velocity. Consequently, these wavefronts propagate upwardly and shift horizontally. Specifically, with reference to FIG. 1(A), the wavefronts formed by the pulse of acoustic wave transmitted in the vertical direction from the pulse acoustic wave source 2 at the time $t_0$ are shifted to the position 3a by the southwest wind $w_1$, during the interval terminating at the time $t_1$, then shifted to the position 3b by the northwest wind $w_2$, during the interval terminating at the time $t_2$, and thereafter shifted to the position 3c by the northwest wind $w_3$, during the interval terminating at the time $t_3$. In FIG. 1(B), 7a, 7b and 7c represent the centers of the wavefronts at the respective positions 3a, 3b and 3c.

Figure 1A:
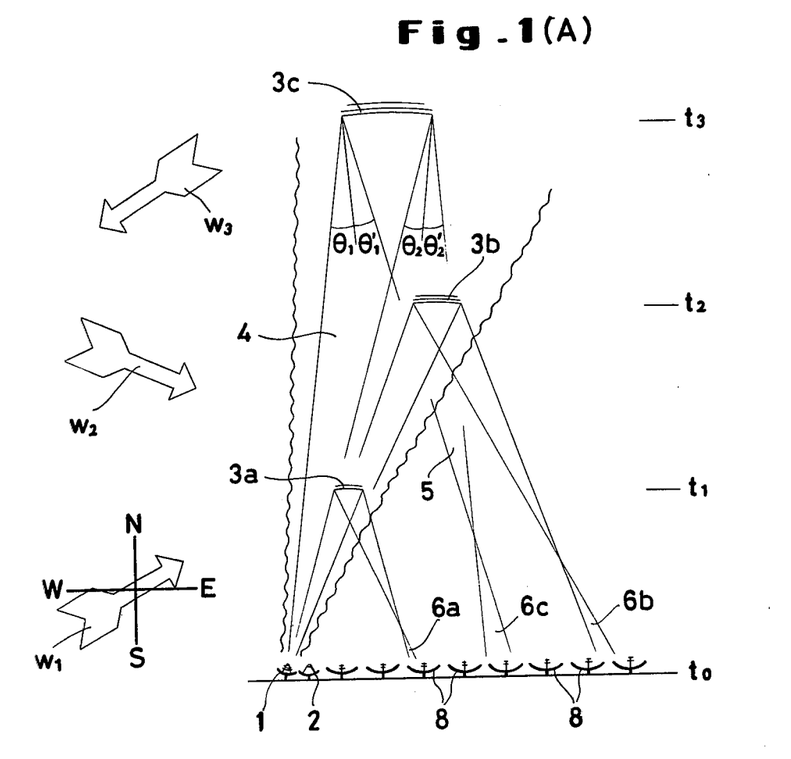
FIG. 1(A) representing a front view and FIG. 1(B) a top view respectively.
Figure 1B:
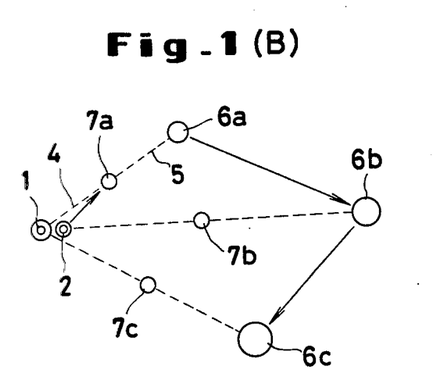

When, under the meteorological conditions described above, radio waves are continuously transmitted from the radio wave source 1 and pulses of acoustic wave from the acoustic wave source 2, the radio waves are reflected, as already described, by the spherical wavefronts which occur within the beam of the radio waves. The reflected radio waves return to the ground and form a relatively small focusing spot. As shown in FIG. 1(A), the radio waves 4 which propagate with incident angles $\theta_1$, $\theta_2$ upon the spherical wavefronts are reflected by the wavefronts with reflective angles $\theta_1'$, $\theta_2'$ equalling the respective incident angles. As a result, the reflected radio waves 5 converge and form a small spot 6 on the ground at a point symmetrically located relative to the straight line drawn to connect the radio wave source 1 and the center of the spherical wavefronts 7. When the atmospheric region under surveillance is in a windless state, the center of the wavefronts ascending into the atmosphere does not waver but coincides with the position of the acoustic wave source. When the wavefronts are shifted by the wind during the intervals terminating at the time $t_1$, $t_2$ and $t_3$ as illustrated in FIG. 1(A), the position at which the spot is formed by the focusing of the reflected radio waves 5 on the ground is correspondingly shifted to positions 6a, 6b and 6c. The center 7 of the ascending wavefronts on the ground, accordingly, located approximately halfway along the straight line drawn to connect the position at which the radio wave source 1 is installed and the position at which the reflected radio waves converge to form the spot on the ground (as shown in FIG. 1(B)). The height distribution of wind speed in the atmospheric region under surveillance, therefore, can be obtained by measuring the positions 6a, 6b and 6c at which the reflected radio waves form the focusing spot by the wavefronts at the times $t_1$, $t_2$ and $t_3$ (strictly, the points at which the reflected radio waves of the maximum magnitude are received), the distances by which the focusing spot of the converged waves is moved between the time intervals, and the lengths of time required for the movements of the spot. The height distribution of wind direction is obtained by noting the directions in which the spot of the converged waves is moved during the time intervals. The speed "V" of the horizontal air stream can be expressed by the following formula, wherein "r" denotes the time intervals of measurement and "R" the distances of the movement of the focusing spot of the converged waves during the time intervals.

$$V \approx (R)/(2r)$$

The position 6 at which the spot is formed by the convergence of the reflected radio waves 5 can be easily determined by having a multiplicity of antennas 8 installed in the pattern of a lattice on the ground for the reception of radio waves on the downwind side of the acoustic wave source 2 and the radio wave source 1 (because the wavefronts are invariably shifted in the downwind direction by the wind) and connecting these antennas severally to the receivers so as to be operated independently of one another. In the lattice of the antennas, the position of the antenna which has received the reflected radio waves represents the position at which the reflected radio waves have converged and formed the focusing spot. When the focusing spot formed by the convergence of reflected radio waves is received by a pluralty of antennas in the lattice, the center of the focusing spot of the converged radio waves can be found by singling out the antenna which has received the radio waves of the maximum intensity.

The pulse of acoustic wave to be transmitted vertically into the atmosphere from the acoustic wave source proves particularly suitable for the purpose of the measurement aimed at by this invention when it is such that the frequency falls within the range of from 680 to 6800 Hz, the wavelength within the range of from 0.05 to 0.5 m, the pulse width within the range of from 10 to 200 ms and the output within the range of from 130 to 150 dB SPL (sound pressure level).

The radio waves to be continuously transmitted from the radio wave source prove suitable for the purpose of the measurement when they have a frequency within the range of from 300 to 3000 MHz, a wavelength within the range of from 0.1 to 1.0 m and an output power within the range of from 1 to 100 W.

Particularly the relation between the wavelength of the acoustic wave and the wavelength of the radio waves is such that the radio waves reflected by the individual spherical wavefronts formed by the acoustic wave are intensified when they are synthesized in the same phase (Bragg's conditions). Under the condition that the radio waves propagate perpendicularly to the spherical wavefronts, for example, the reflected radio waves become most powerful when the ratio of the wavelength of the acoustic wave to that of the radio waves is 1 to 2.

The speed of the acoustic wave and consequently its wavelength varies according to changes in atmospheric temperature. The measurement by the present invention, therefore, is effected with the best results by fine adjustment of the frequency of the acoustic wave to be transmitted in accordance with the atmospheric temperature in the region under surveillance so that there may be produced reflected radio waves of the highest possible intensity.

Examples of antennas to be used for the transmission of such acoustic waves are ordinary acoustic antennas including paraboloidal dish type antennas, horn-reflector type antennas and straight horn type antennas.

For the transmission of the aforementioned radio waves, aperture antennas having a diameter within the range of from 0.2 to 2 meters prove particularly desirable among other antennas available.

By the time that the radio waves transmitted from the radio wave source and subsequently reflected by the spherical wavefronts are brought back to the ground, they are attenuated in intensity to the order of $10^{-13}$ to $10^{-14}$. For the reception of such reflected radio waves, short backfire antennas having a diameter within the range of from 0.3 to 2.0 m and showing a gain of about 15 dB are advantageously used among other antennas available. Since the receives to be connected to the antennas are required to possess a wide dynamic range of 120 dB or more, those of the homodyne type prove advantageous for the measurement aimed at.

The accuracy of the detection of the position of the focusing spot of reflected radio waves increases in proportion as the intervals separating the individual antennas of the network decrease. Enhancement of the accuracy of determination, therefore, necessitates an addition to the number of antennas to be used in the network. Although the magnitude of such intervals is best fixed with due consideration paid to various factors such as the size and sensitivity of each antenna and the purpose of measurment, it is generally selected within the range of from 0.5 to 3.0 m for practical purposes. If the intervals are greater than the upper limit 3.0 m, there may arise times when accurate detection of the position of the image of maximum intensity will not be obtained. The overall size of the antenna network is to be determined by the highest expected value of wind speed to be measured and the maximum altitude expected to be covered by the measurement. When using a square antenna network having sides of 20 meters, for example, the focusing spot formed by the convergency of reflected radio waves can be caught by the antenna network so long as the center of wavefronts ascending into the atmosphere falls within 10 meters of the position of the acoustic wave source. Where the determination of height distribution of wind direction and speed is expected to cover wind blowing at speeds up to 5 m/sec at altitudes up to 1000 meters, for example, the antenna network is required to have sides of 30 meters.

Figure 2:
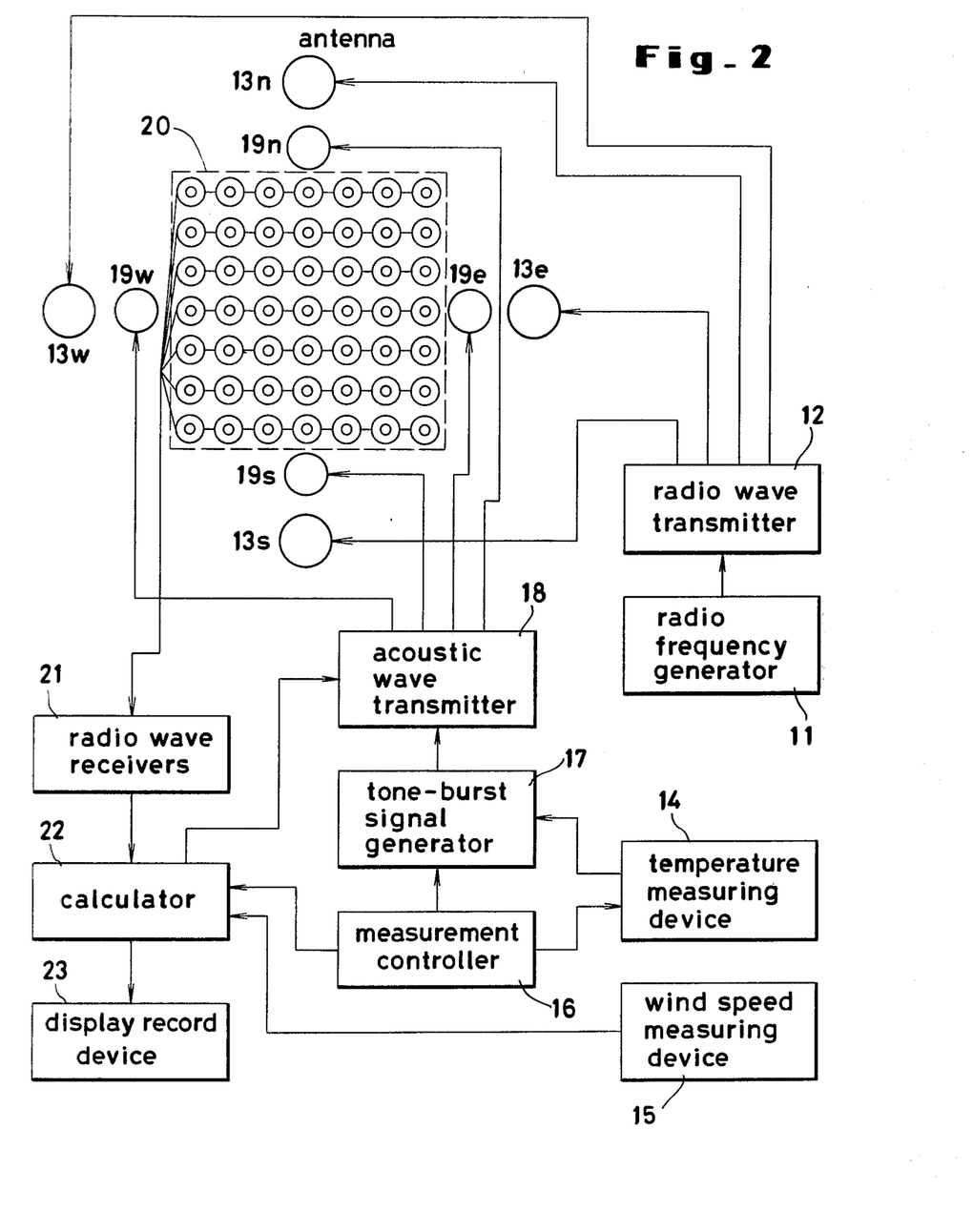
FIG. 2 is a block diagram illustrating the operation of the method of this invention for the remote measurement of wind direction and speed.

FIG. 2 is a block diagram illustrating one embodiment of the apparatus for the measurement of wind direction and speed according to the present invention. A multiplicity of antennas are laid out in the pattern of a lattice to form a receiving antenna network 20 for detecting the position at which the reflected radio waves converge and form a focusing spot. Along the sides of the receiving antenna network 20, antennas 13$e$, 13$w$, 13$s$ and 13$n$ for transmitting radio waves and antennas 19$e$, 19$w$, 19$s$ and 19$n$ possessing directivity for transmitting pulse acoustic waves are paired and disposed close to each other, with the acoustic wave transmitting antenna on the inner side. The antennas in the receiving antenna network 20 and the same number of radio wave receivers 21 as that of the antennas are connected respectively to each other, and the receivers 21 are all connected to a wind direction and speed calculator 22. The antennas 13$e$, 13$w$, 13$s$ and 13$n$ for transmitting radio waves are connected to a radio frequency generator 11 via a radio wave transmitter 12. The pulse acoustic wave transmitting antennas 19$e$, 19$w$, 19$s$ and 19$n$ are connected to a tone-burst signal generator 17 via an acoustic wave transmitter 18. The tone-burst signal generator 17 is connected to a measurement controller 16 and a surface temperature measuring device 14. A surface wind speed measuring device 15 is connected to a wind direction and speed calculator 22, which is connected to the acoustic wave transmitter 18 and a display-record device 23.

In the construction formed as described above, a radio frequency generator 11 fixes the frequency of the radio waves to be transmitted. The output signal from the generator 11 is amplified in power by the radio wave transmitter 12 and simultaneously conveyed to the antennas 13$e$, 13$w$, 13$s$ and 13$n$ and transmitted through the antennas as continuous radio waves upwardly into the atmosphere. Separately, the conditions for measurement such as the range of altitudes to be covered by the measurement are inputted to the measurement controller 16, so that the pulse width and the repetition period for pulse acoustic waves to be transmitted are produced in the form of pulse acoustic wave control signals, which are forwarded to the tone-burst signal generator 17. To approximate the ratio of the wavelengths of acoustic waves and radio waves to be used in the range of altitudes selected for the measurement, the speed of sound in the range of altitudes is calculated in the surface temperature measuring device 14 based on the surface temperature measured by the device 14 and the temperature decrease coefficient stored in advance in the device 14. Then, based on the result of this calculation, the optimum carrier frequency is calculated and forwarded as the frequency control signal to the tone-burst signal generator 17. The tone-burst signal generator 17 generates a tone-burst signal determined by the control signal from the measuring device 14 and the control signal from the measurement controller 16 and forwards the tone-burst signal to the acoustic wave transmitter 18. In the transmitter 18, the aforementioned signal is subjected to stated power amplification. The acoustic wave transmitter 18 possesses a built-in output switch which is operated by the signal from the wind direction and speed calcuator 22. Prior to the transmission of pulses of acoustic wave, of the four acoustic wave antennas, that which is located furthest upwind relative to the receiving antenna network is singled out by the calculation based on the data from the calculator 22 and the signal from the wind speed measuring device 15. The transmitter 18 issues a relevant command signal to the aforementioned output switch. Consequently, the amplified tone-burst signal is supplied to the one antenna for transmitting pulse acoustic waves singled out as described above, and is transmitted by that antenna vertically into the atmosphere. Selection of the antenna from among the set of four is made by the command signal to be issued by the calculator 22 each time the generation of pulses of acoustic wave is made.

As described above, the pulse acoustic waves transmitted from the pulse acoustic wave source propagate themselves upwardly into the atmosphere while forming spherical wavefronts. When the wavefronts are present within the range of directivity characteristic of the continuous radio waves transmitted from the radio wave transmitting antennas 13$e$, 13$w$, 13$s$ and 13$n$, the radio waves are reflected by these spherical wavefronts and are converged to produce a focusing spot on the ground. The focusing spot due to the convergence of the reflected radio waves is received on the receiving antenna network 20 formed of the multiplicity of antennas. The reception output signals of the individual antennas constituting the receiving antenna network are transferred through the multiplicity of radio wave receivers 21 and fed to the wind direction and speed calculator 22, and the memory unit built in the calculator 22 stores at fixed intervals the numerical values of the receiving output signals accumulated within fixed intervals. By singling out the largest numerical value of received output signal from among the values stored in the memory unit, the position of the particular antenna which has received that output signal can be found. This position represents the position at which the reflected radio waves have been converged to form the focusing spot. The numerical value denoting this position is stored in the memory unit built in the calculator 22. When the storate of this value is performed at intervals of 1/33 second, for example, the height distribution of wind direction and speed can be obtained at vertical intervals of about 10 m. The data thus obtained are forwarded to the wind direction and speed display-record device 23, there to be displayed and recorded.

Besides the aforementioned functions of data storage and arithmetic operation, the wind direction and speed calculator 22 fulfills another function of responding to the wind direction signal received from the wind speed measuring device 15 for each generation of the pulse of acoustic wave and consequently issuing to the acoustic wave transmitter 18 a command signal indicating the direction in which the selected one of the four pulse acoustic wave antennas provided along the sides of the receiving antenna network 20 is required to transmit the acoustic wave.

A total of 36 short backfire antennas having a diameter of 0.7 m and a gain of 15 dB were laid out on the ground in the pattern of a square lattice containing six antennas each in six rows and homodyne type receivers were connected one each to the 36 antennas. Close to the center of each of the four sides of the lattice-like antenna network, a parabola antenna having a diameter of 3 m and a gain of 26 dB and a straight horn type antenna having an aperture diameter of 1 m were paired and installed. From the four parabola antennas mentioned above, radio waves having an output power of 10 W, a frequency of 890.5 MHz and a wavelength of about 0.33 m were transmitted upwardly into the atmosphere, with the beam width fixed at about 7 degrees. From the windward one of the four straight horn type antennas designated by the wind direction and speed calculator, acoustic waves having a wavelength of about 0.165 m, a pulse width of 100 ms and a frequency of 2000 Hz and amplified to 300 W (equivalent to about 130 dB SPL) were transmitted at intervals of 3 seconds vertically into the atmosphere, with the transmission beam width fixed at about 15 degrees.

Each time one pulse of acoustic wave was transmitted, the radio wave reflected back by the spherical wavefronts formed by the acoustic wave was received by a specific member of the network of receiving antennas.

Figure 3:
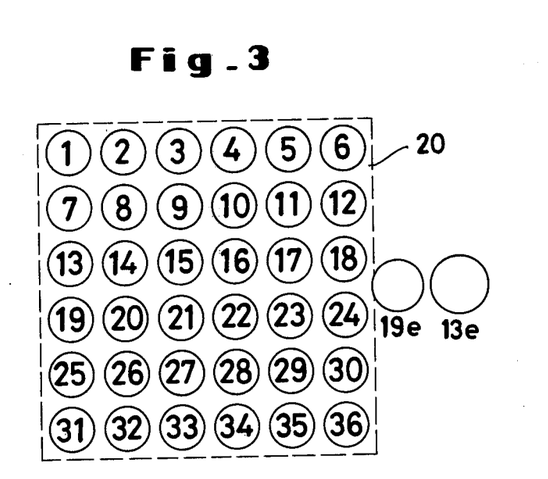
FIG. 3 is a plan view illustrating the layout of an apparatus used in a working example of this invention.
Figure 4:
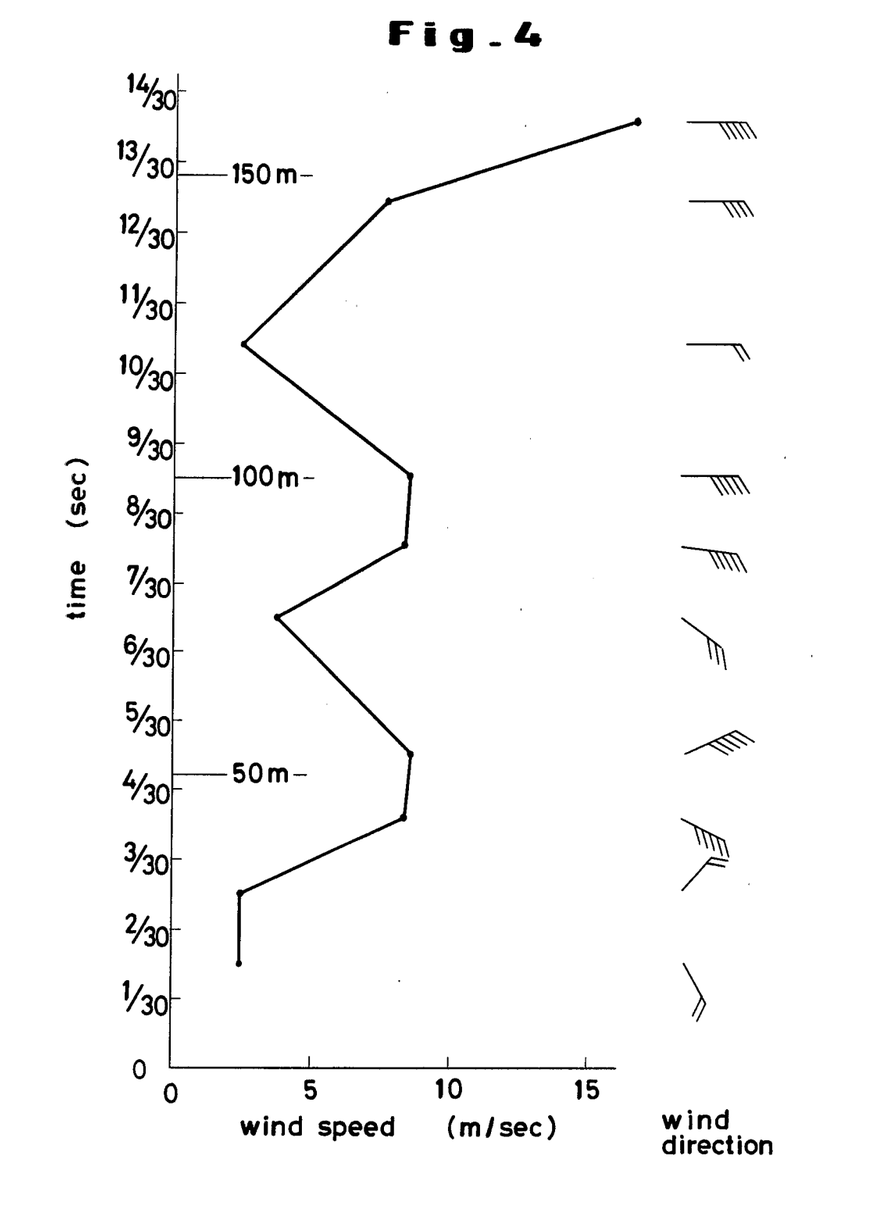
FIG. 4 is a graph showing one embodiment of a height distribution of wind direction and speed measured by the apparatus of FIG. 3.

At intervals of 1/30 second after transmission of one pulse acoustic wave from the acoustic wave transmitting antenna on the east side, the positions relative to the network of the antennas which had received the strongest reflected radio waves and the magnitudes of such strongest radio waves were detected. The results were as shown in Table 1, wherein the relevant antennas are identified based on the serial numbers assigned to the individual antennas of the antenna network as indicated in FIG. 3. Calculation of the time-course change of wind direction and speed in the atmospheric region based on the data of Table 1 gives the height distribution of wind direction and speed as shown in FIG. 4.

TABLE 1

| Elapse of time (second) | Serial number of antenna receiving reflected radio wave | Intensity of signal received (dBm) |
|---|---|---|
| 1/30 | 18, 24 | exceeding −90 |
| 2/30 | 17, 18, 24 | " |
| 3/30 | 17, 18, 23, 24 | " |
| 4/30 | 16, 17, 18, 23 | " |
| 5/30 | 16, 17, 22, 23 | " |
| 6/30 | 16, 17, 22, 23 | " |
| 7/30 | 15, 16, 17, 22 | " |
| 8/30 | 15, 16 | " |
| 9/30 | 15 | " |
| 10/30 | 15 | " |
| 11/30 | 15 | " |
| 12/30 | 14, 15 | −93 ~ −96 |
| 13/30 | 14 | −90 ~ −93 |
| 14/30 | 13 | −99 ~ −102 |

From the data, it is seen that on lapse of 3/30 second from the transmission of the pulse of acoustic wave (with the pulse reaching an altitude of about 34 m), a focusing spot formed by the convergence of reflectfed radio waves measuring in excess of −90 dBm in intensity was received by the antennas, Nos. 17, 18, 23 and 24 and on lapse of 4/30 second (with the pulse reaching an altitude of about 45 m), a focusing spot formed by the convergence of reflected radio waves exceeding −90 dBm in intensity was received by the antennas, Nos. 16, 17, 18 and 23. On the assumption that, among the set of antennas which received the focusing spot, that which was centrally located received the strongest signal, then during the interval of 1/30 second between the two time points mentioned above, the focusing spot of the reflected radio waves was shifted by 0.58 m in the northwest direction. Based on the formula given previously, the wind speed "V" is found by calculation to have been 8.7 m/sec. The information indicates that a southeast wind was blowing at an average speed of 8.7 m/sec between the altitudes of 34 to 45 m. In the interval between the time points 9/30 sec and 12/30 sec, the focusing spot of the reflected radio waves was shifted by only 0.5 m to the west. This information indicates that an east wind was blowing at an average speed of 2.5 m/sec between the altitudes of 99 and 132 m.

On a rather windless day, the same system as indicated above was tried under the same conditions. At intervals of 1/33 seconds after transmission of one pulse of acoustic wave, the positions of the antennas which received a focusing spot of the reflected radio waves and the intensity of such radio waves were as shown in Table 2. The time interval of 1/33 second corresponds to a unit distance of 10 m travelled by the acoustic wave.

TABLE 2

| Elapse of time (second) | Serial number of antenna receiving reflected radio wave | Intensity of signal received (dBm) |
|---|---|---|
| 1/33 | 18, 24 | exceeding −90 |
| 2/33 | 17, 18, 24 | " |
| 3/33 | 17, 18, 23, 24 | " |
| 4/33 | 16, 17, 18, 22, 23, 24 | " |
| 5/33 | 16, 17, 22, 23 | " |
| 6/33 | 16, 17, 22 | " |
| 7/33 | 22 | " |
| 14/33 | 27, 28 | −96 ~ −99 |
| 15/33 | 27 | " |
| 24/33 | 26 | −99 ~ −102 |
| 27/33 | 25, 26 | " |
| 32/33 | 25 | below −102 |

Figure 5:
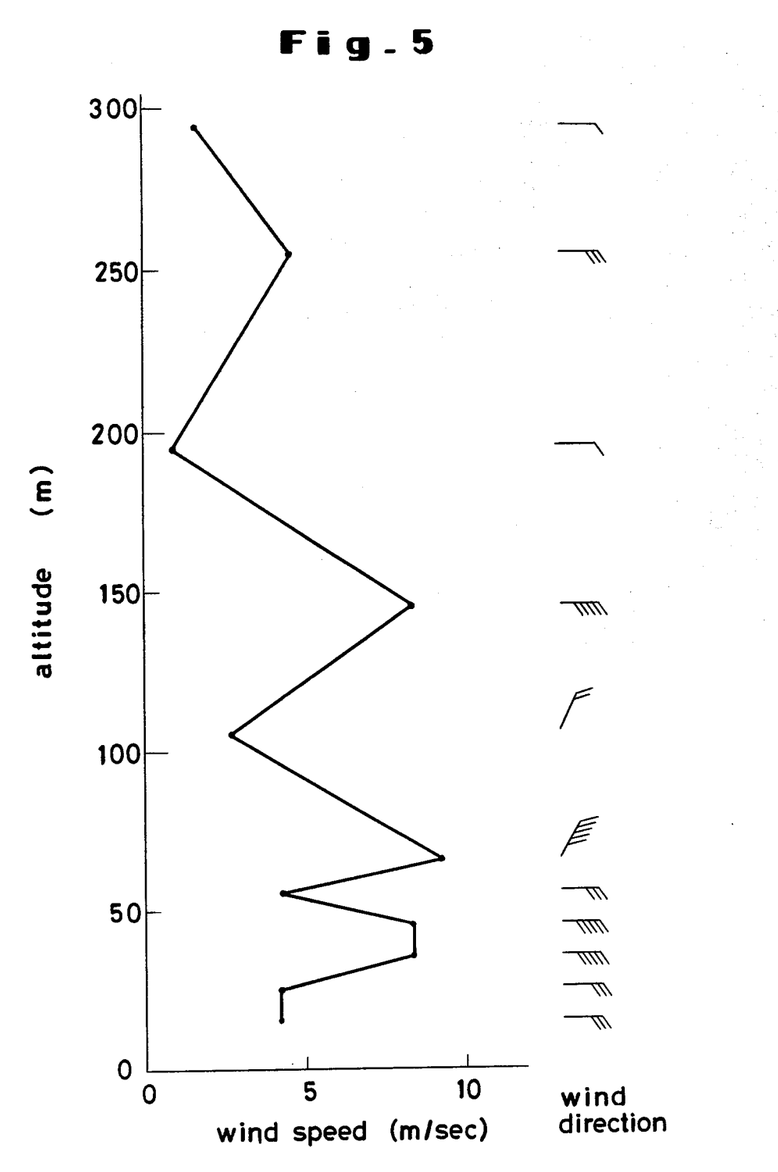
FIG. 5 is a graph showing another embodiment of a height distribution of wind direction and speed measured by the apparatus of FIG. 3.

In the table given above, no results of measurement are entered for the intervals between the time points 8/33 and 13/33 second. Absence of data indicates that the positions of the antennas receiving the focusing spot were the same as those indicated in the immediately preceding time interval. Calculation of the time-course change of wind direction and speed in the atmospheric region based on the data of the foregoing table gives the height distribution of wind direction and speed as shown in FIG. 5.

From the data, it is seen that the position of the focusing spot of the reflected radio waves was shifted by 0.5 m between the altitudes of 10 to 30 m. This information indicates that an east wind was blowing at an average speed of about 4.1 m between the two altitudes mentioned above. The wind direction and speed were substantially the same as those determined by the conventional method. The focusing spot was shifted by about 0.5 m between the altitudes of 150 and 240 m. This information indicates that an east wind was blowing at an average speed of about 0.9 m between the altitudes mentioned above.

The receivers which were connected to the respective receiving antennas used in the foregoing example were capable of receiving signals of intensity to −125 dBm. Since the receiving antenna network had a relatively small overall size (5 m square), the focusing spot of the reflectfed radio waves fell outside the bounds of the antenna network when the spherical wavefronts formed by the acoustic waves were shifted only slightly at high altitudes. Thus, the system failed to provide measurement of the wind direction and speed at altitudes exceeding 300 m. The measurement by this invention can be easily obtained to altitudes up to about 1500 m by using an enlarged system.

The layout of a receiving antenna network, antennas for transmitting radio waves and pulse acoustic waves shown in FIG. 2 is just one typical example. Where the measurement of wind direction and speed is limited in a generally fixed direction, the acoustic wave antenna and the antenna for the transmission of radio waves have only to be installed in the fixed windward direction of the receiving antenna network. As concerns the receiving antenna network, the accuracy with which the height distribution of wind direction and speed is obtained can be heightened by having smaller antennas of higher performance laid out more densely in the pattern of a lattice.

According to this invention, when a pulse of acoustic wave is transmitted vertically into the atmosphere at an angle of 15 degrees, for example, spherical wavefronts more than 100 m in diameter are formed at an altitude of 500 m. The radio waves which are reflected by these spherical wavefronts are converged to form a focusing spot a few square meters in area on the ground. By detecting the positions at which the reflected radio waves are received with stated high magnitudes and noting the time-course change of these positions, the present invention accomplished the measurement of the height distribution of wind direction and speed at altitudes in the atmospheric region under surveillance. Thus, the arithmetic operations performed on the signals of received radio waves are simplified and the results of measurement are obtained with high reliability and rapidity. The measurement, from the operational point of view, only calls for installation of a receiving antenna network, acoustic wave source and radio wave source on the ground. These facilities can easily be moved. Thus, the present invention can be used advantageously for the measurement of wind direction and speed in the atmospheric regions over urban districts.

What is claimed is:

1. A method for the measurement of wind direction and speed at high altitudes in the atmosphere, comprising the steps of transmitting vertically into the atmosphere a pulse of acoustic waves from an acoustic wave source installed on the ground thereby causing the pulse of acoustic wave to produce spherical wavefronts, transmitting continuous radio waves from a radio wave source installed on the ground toward the spherical wavefronts thereby enabling the radio waves to be reflected by the spherical wavefronts, detecting the position of the reflected radio waves formed as a focusing spot on the ground, tracing the time-course change of the positions of maximum intensity of the focusing spot of the reflected radio waves, and calculating the height distribution of wind direction and speed in the atmospheric region based on the time-course change of the position of the focusing spot.

2. The method according to claim 1, wherein the detection of the positions of the reflected radio waves to converge to form the focusing spot on the ground is effected by an antenna network comprising a plurality of antennas laid out in the pattern of a lattice.

3. An apparatus for the measurement of wind direction and speed, comprising a pulse acoustic wave source for transmitting a pulse acoustic wave vertically into the atmosphere to propagate the acoustic wave to produce spherical wavefronts, a radio wave source for transmitting a continuous radio wave in the direction of the spherical wavefronts, a receiving antenna network formed of a plurality of receiving antennas laid out in the pattern of a lattice, said receiving antenna network being disposed downwind of said pulse accoustic wave source and said radio wave source and adapted to detect the radio wave reflected by the spherical wavefronts, radio wave receivers connected one each of said receiving antennas of the antenna network, means for detecting the antenna receiving the reflected radio wave of the maximum intensity from among the antennas of the antenna network, and means for calculating the wind direction and speed based on the position of the antenna receiving the reflected radio waves of the maximum intensity.

4. The apparatus according to claim 3, which further comprises means for displaying the wind direction and speed determined by said calculating means.

5. The apparatus according to claim 3, wherein the radio waves are transmitted toward the spherical wavefronts at a wavelength such that, at the time that the waves perpendicularly propagate upon the spherical wavefronts, said radio waves possess a wavelength twice the wavelength of the acoustic wave.

6. The apparatus according to claim 3, wherein the pulse acoustic wave source transmits a pulse of acoustic wave of 130 to 150 dB SPL.

7. The apparatus according to claim 3, wherein the radio wave source transmits a continuous wave having a frequency within the range of from 300 to 3000 MHz and a wavelength within the range of from 0.1 to 1.0 m.

8. An apparatus for the remote measurement of wind direction and speed, comprising a receiving antenna network formed of a plurality of receiving antennas laid out on the ground in the pattern of a lattice, a radio wave transmitting antenna and a pulse acoustic wave source disposed as paired near the center of each of the four sides of said receiving antenna network, said transmitting antenna and said source being positioned close to each other, a surface temperature measuring means for setting the frequency of the pulse acoustic wave transmitted by said pulse acoustic wave sources, a tone-burst signal generator for setting the cycle and pulse width of said pulse acoustic wave, a pulse acoustic wave transmission indicator adapted to measure the wind direction on the ground and issue a command for causing, among the four pulse acoustic wave sources, the windward one selectively to transmit the pulse acoustic wave, a radio wave transmitter for transmitting a continuous radio wave through said radio wave transmitting antennas toward the spherical wavefronts formed by the pulse acoustic wave transmitted by said pulse acoustic wave source vertically into the atmosphere, a wind direction and speed calculator adapted to cause the radio waves reflected by said spherical wavefronts to be received by said receiving antenna network, detect the positions of the receiving antennas in the antenna network which have received the reflected radio waves of maximum magnitude, trace the time-course change of these positions and, based on the data thus collected, calculate the height distribution of wind direction and speed, and a wind direction and speed display-record device for displaying and recording the height distribution of wind direction and speed.

9. The apparatus according to claim 8, wherein the radio waves are transmitted toward the spherical wavefronts at a wavelength such that, at the time that the waves perpendicularly propagate upon the spherical wavefronts, said radio waves possess a wavelength twice the wavelength of the acoustic wave.

10. The apparatus according to claim 8, wherein the pulse acoustic wave source transmits a pulse of acoustic wave of 130 to 150 dB SPL.

11. The apparatus according to claim 8, wherein the radio wave source transmits a continuous wave having a frequency within the range of from 300 to 3000 MHz and a wavelength within the range of from 0.1 to 1.0 m.

* * * * *